Patented Aug. 18, 1953

2,649,390

UNITED STATES PATENT OFFICE 2,649,390

PROCESS OF TREATING SUGAR SOLUTIONS WITH ION-EXCHANGE RESINS

James C. Winters, Glenside, Pa., and Robert Kunin, Trenton, N. J., assignors to Rohm & Haas Company, Philadelphia, Pa., a corporation of Delaware No Drawing. Original application April 13, 1948, Serial No. 20,847. Divided and this application November 13, 1950, Serial No. 195,466

4 Claims. (Cl. 127—46)

This invention is an improvement in the deionization of aqueous sugar solutions by means of ion-exchange materials. This application is a division of our copending application Serial No. 20,847, filed April 13, 1948, which issued May 1, 1951, as U. S. Patent No. 2,551,519.

It is known that in the processing of both sugar beet and cane sugar juices the presence of inorganic salts in sugar solutions interferes with the recovery of the sucrose. It is also known that the salts of different metals have different effects and that the alkaline earth metals such as calcium are much more melassigenic than is sodium. The presence of calcium in refinery solutions is also objectionable for the reason that its salts are primarily responsible for the scale that forms on the evaporators. To overcome these salt effects, it has heretofore been proposed to deionize the defecated raw sugar juice by passing it first through a bed of cation-exchange resin wherein hydrogen from the resin is exchanged for the cations of the salt in solution and then through a bed of anion-exchange resin which adsorbs the acid formed in the bed of cation-exchange material. Usually the juice is passed in this fashion through a series of alternating cation- and anion-exchange beds and the salt content of the juice reduced in steps. A disadvantage of this process as it is currently practiced is that the acidic condition of the juice leaving the cation-exchange bed is conducive to the inversion of the sucrose. To overcome this, the juice must be reduced to a temperature of approximately 20° C., a practice that is economically feasible only where low temperature cooling water is available in large amounts. A further disadvantage of the process as currently practiced is that the high calcium content of the defecated juice requires that special regenerating techniques be employed for the most economical operation.

The cation-exchange materials heretofore used in deionizing sugar solutions are those that contain strongly acidic polar groups such as sulfonate or sulfate. Sulfonated coals, sulfonated phenol-formaldehyde resins, and sulfonated styrene-divinyl benzene copolymers are examples of such materials. These materials, having strongly acidic groups, have the power to split neutral salts; i. e., to replace the cation of the salt with hydrogen from the exchange material. To regenerate them requires the use of fairly strong acid. Sulfuric acid is the cheapest strong acid available and its use is desirable whenever possible. It cannot, however, be used directly to regenerate these sulfonate exchange materials when they are loaded with calcium ion for the reason that insoluble calcium sulfate forms on the particles of exchanger and interferes with their operation. To overcome this, it has been proposed to remove the calcium from the exchanger by ion-exchange with a solution of common salt and then regenerate with sulfuric acid.

We have now found the objectionable effects of the presence of calcium salts in sugar solutions can be eliminated without the generation of a low pH in the solution by passing defecated juice through a bed of cation-exchange material in which the polar groups are carboxylic acid groups. The carboxylic cation-exchange resins in their acidic form are only weakly acidic and do not split salts to any substantial degree. Nevertheless we have found that from one-third to one-half the ash content of a sugar solution as it leaves the normal defecation step can be removed by one passage of the solution through a bed of this type exchanger. Most of the ash thus removed is calcium. There is, therefore, provided a means of substantially reducing the salt content of the sugar solution and of practically eliminating the objectional effects of calcium while at the same time avoiding the low pH that is encountered in the deionization processes heretofore proposed.

Unlike the sulfonate type exchange materials, the carboxylic type can be regenerated with very weak acids whereby the problem of calcium precipitation is avoided. These resins may also be regenerated by means of an aqueous solution of carbon dioxide under pressure whereby calcium may be removed as the bicarbonate.

The carboxylic acid resins that we prefer to use are those crossed-linked polymers of polymerizable acids described in U. S. Patents Nos. 2,340,110 and 2,340,111. Particularly suitable are the crossed-linked polymers of acrylic acid, or methacrylic acid, or maleic acid such as are obtainable by the joint polymerization of one or more of the acids with divinyl benzene. In such resins the divinyl benzene or other cross-linking component renders the resins insoluble, and it is desirable to use an amount not substantially higher than will accomplish this. From 2½% to 10% of divinyl benzene based on the weight of polymerizable acid is a practical operating range.

When it is not desired to effect a further reduction in ash content than is accomplished by passing the sugar solution through a bed of carboxylic cation-exchange resin, the pH of the effluent solution may be controlled by using the resin in a mixed acid-sodium salt form rather than in a fully acidic form. The effluent from a bed of these resins in their fully acidic form will have a pH that may be as low as, but not lower than, about 3.5. This may be a lower pH than is desired to have exist in the evaporators. A higher pH in the effluent solution will result from the use of a mixed acid and sodium salt form of resin which may be readily prepared by treating the resin as in regeneration with a solution of sodium salt and acid. By varying the ratio of salt to acid in such a mixture, the ratio of sodium salt groups to acid groups in the treated resin may be varied; and the greater the number of sodium salt groups in the resin the higher will be the pH of the effluent. In this way the pH of the effluent may be adjusted to neutrality if desired.

Alternatively, the sugar solution after passage through the bed of carboxylic type cation-exchange resin may be passed in the usual fashion through a bed of anion-exchanger. The anion-exchanger may be of the type heretofore used wherein the polar groups are amino groups or it may be of the new quaternary ammonium type. The amino type anion-exchangers are exemplified by the phenol formaldehyde-polyalkylene polyamine described in U. S. Patent No. 2,402,384. These resins in their basic form will adsorb free acid from solutions but have little or no effect upon neutral salts contained in the solution. By their use the pH of the sugar solution leaving the anion resin exchanger will be raised to approximately 9–9.5.

Deionization may be continued by passing the solution through a series of alternating carboxylic type cation-exchange beds and amino type anion-exchange beds, but subsequent beds of carboxylic exchanger will not remove as large a quantity of metallic ions from the solution as does the first bed. It will, therefore, require a number of alternating beds to complete deionization. This method of practicing our invention has the advantage of maintaining the pH of the sugar solution at all times between the limits of about 3.5 and 9.5 but the disadvantage of requiring a considerable series of alternating beds for complete deionization.

Complete deionization in fewer additional pairs of beds can be accomplished either by using as the anion-exchanger a quaternary ammonium type of anion-exchange resin or by using in a second bed of cation-exchanger a sulfonate type of cation-exchanger. The quaternary ammonium type of anion-exchanger is obtainable by haloalkylating a base resin containing aromatic groups and then replacing the halogen by a quaternary ammonium group by reacting with a tertiary amine. In patent application Serial No. 759,308, now Patent Number 2,591,573, filed July 5, 1947, there are disclosed resins of this class made by chloromethylating a copolymer of a monovinyl aromatic compound and a divinyl aromatic compound and reacting the chloromethylated polymer with trimethylamine or a similar tertiary amine. A copolymer of styrene and divinyl benzene is the base resin recommended. These quaternary ammonium anion-exchangers, like the sulfonated cation-exchangers, have the ability to split salts but in so doing they remove the anion rather than the cation. They will, for example, remove chloride ion from a sodium chloride solution. When used in the second bed of a sugar solution deionization process, they will remove anions to such an extent that the pH of the solution passing through the bed reaches as high as 12. Additional cations may then be removed by passing the solution through a second bed of carboxylic exchanger, and by repeating the alternating beds the solution may be rapidly deionized. The deionization of sugar solutions by passing them through alternating beds of first a quaternary ammonium exchanger and then a carboxylic resin is described and claimed in copending application Serial No. 20,836 of Charles H. McBurney filed April 13, 1948.

Instead of using the carboxylic type resin for the second and subsequent cation-exchange beds, a sulfonated cation-exchanger may be used at these stages without all of the disadvantages heretofore mentioned incident to the use of this type of exchanger. Some acidity in the effluent may result from its use, particularly if an anion-exchanger having amino polar groups is used; but this acidity will be less serious than what is currently met and, if necessary, can be overcome by the same techniques.

When an initial bed of carboxylic acid cation-exchange resin is used in conjunction with subsequent beds of sulfonate type of cation-exchange resin, it is not necessary that a bed of anion-exchange resin be interposed between the bed of carboxylic acid resin and the first bed of sulfonate type resin. Instead, the sugar solution may be passed directly from the carboxylic resin bed to the sulfonated resin bed. In this mode of operating, the carboxylic acid resin functions to remove the metals that are present as their hydroxide or as salts of very weak acids leaving the full capacity of the sulfonated resins to operate upon the salts of stronger acids. This will result in acidity being formed in the sugar solution, but it has the marked advantage of permitting the use of a smaller bed of sulfonate exchanger or the sugar solution can be more rapidly passed to the anion-exchanger wherein the acidity is removed. A further advantage of this combination over the use of a sulfonated exchanger alone as the first bed resides in the fact that the very high capacity of the carboxylic exchangers and the utilization of the lower capacity sulfonated exchangers only to split the salts of stronger acids permit less frequent regeneration of the beds.

This invention is particularly applicable to the treatment of the defecated raw sugar juices; that is, the clarified raw juice after it has been limed with or without carbonation, sulfitation, or treatment with phosphoric acid, and to the treatment of the affination syrup which is obtained from the washing of a raw cane sugar cake particularly when the affination syrup is limed and defecated. It may, however, also be applied to the sweet water obtained from the washing of materials or equipment such as the filter washings and to the char wash liquors obtained in washing the sugar from exhausted bone char. Thus, the process of this invention can be used in the de-ashing of sugar solutions which are as dilute as sweet water or as concentrated as syrups.

The following examples are given to illustrate the extent of ash removal that may be accomplished by passing sugar syrup through a bed of carboxylic acid type cation-exchange resin.

Example 1

Sugar beet solution, after the carbonation step and having a concentration of 12 Brix, a pH of 9.42, and an ash content of 0.22%, was passed through a column of cation-exchange resin that was a copolymer of 95 parts of methacrylic acid and 5 parts of divinyl benzene. Samples of effluent leaving the column were withdrawn from time to time and analyzed. After four volumes of solution per volume of resin had passed through the column, the sample withdrawn had a pH of approximately 4 and an ash content of approximately 0.09%. When eight volumes of solution per volume of resin had passed through, a sample withdrawn had a pH of approximately 4.4 and an ash content of 0.10%. After sixteen volumes had passed, the effluent had a pH of approximately 4.7 and an ash content of approximately 0.12%. At the thirty-two volume mark, the sample of effluent had a pH of approximately 5 and an ash content of approximately 0.13%. The pH and ash content of the effluent continued to rise gradually. The passage of solution through the column may be discontinued at any desired point.

Example 2

A defecated can sugar solution, having a pH of 6.2 and an ash content of 0.147%, was passed through a column of resin as in Example 1. After twelve volumes of solution per volume of resin had passed through the column, a sample of effluent as it left the column had a pH of 4.2 and an ash content of 0.106%. As in Example 1, the pH and ash content of the effluent thereafter continued to rise gradually and the operation may be discontinued at any desired point.

The carboxylic resins used in these examples may be regenerated by passing through the column a slight excess over the stoichiometric equivalent of strong mineral acid in concentration as low as 0.01 molar. At this concentration of sulfuric acid insoluble calcium sulfate is not formed and the use of this acid is, therefore, permitted.

After the reduction in ash content, as illustrated in these examples, a sugar solution may, if desired, be treated to remove the remaining ash by any of the procedures above-mentioned. As the final step of a deionization process, the pH of the deionized solution may be adjusted by passing the deionized solution through a bed of carboxylic resin that is in a mixed sodium and hydrogen form and in which the ratio of sodium to replaceable hydrogen is so adjusted as heretofore described so that the effluent will have the pH desired. Such a bed of resin acts on the deionized solution as a buffer and may be used for long periods without need for a readjustment of the ratio of sodium salt groups to acid groups in it.

We claim:

1. The method of purifying a dilute sucrose solution containing dissolved salts which comprises the three essential steps of directing the solution first through a bed of cation-exchange resin in which the principal polar groups are carboxylic acid groups, next through a bed of anion-exchange resin in which the principal polar groups are quaternary ammonium hydroxyl groups, and then through a bed of cation-exchange resin in which the principal polar groups are carboxylic acid groups.

2. The method of purifying a dilute sucrose solution containing dissolved salts which comprises the three essential steps of directing the solution first through a bed of cation-exchange resin which is a cross-linked polymer of a polymerizable carboxylic acid, next through a bed of anion-exchange resin containing quaternary ammonium hydroxyl groups attached through methylene groups to aromatic rings in the resin, and then through a bed of cation-exchange resin which is a cross-linked polymer of a polymerizable carboxylic acid.

3. The method of purifying a dilute sucrose solution containing dissolved salts which comprises the three essential steps of directing the solution first through a bed of cation-exchange resin which is a copolymer of divinyl benzene and a member of the class consisting of acrylic, methacrylic, and maleic acids, next through a bed of anion-exchange resin containing quaternary ammonium hydroxyl groups attached by methylene groups to the aromatic nuclei of a cross-linked styrene polymer, and then through a bed of cation-exchange resin which is a copolymer of divinyl benzene and a member of the class consisting of acrylic, methacrylic, and maleic acids.

4. The method of purifying a dilute sucrose solution containing dissolved salts which comprises the three essential steps of directing the solution first through a bed of cation-exchange resin which is a copolymer 2½% to 10% of divinyl benzene and 90% to 97½% methacrylic acid, next through a bed of anion-exchange resin containing quaternary ammonium hydroxyl groups attached by methylene groups to the aromatic nuclei of a copolymer of styrene and divinyl benzene, and then through a bed of cation-exchange resin which is a copolymer 2½% to 10% divinyl benzene and 90% to 97½% methacrylic acid.

JAMES C. WINTERS.
ROBERT KUNIN.

References Cited in the file of this patent

UNITED STATES PATENTS

| Number | Name | Date |
| --- | --- | --- |
| 2,319,359 | Wassenegger | May 18, 1943 |
| 2,404,367 | Durant et al. | July 23, 1946 |
| 2,490,716 | Smith | Dec. 6, 1949 |

OTHER REFERENCES

Bauman: "Improved Synthetic Ion Exchange Resin," Ind. and Eng. Chem., January 1946, pages 46 to 50 (page 47 pertinent).